United States Patent
Hwang

(10) Patent No.: US 8,137,516 B2
(45) Date of Patent: Mar. 20, 2012

(54) METHOD FOR MANUFACTURING HYDROGEN-OXYGEN GENERATING ELECTRODE PLATE

(76) Inventor: Boo-Sung Hwang, Seong-nam si (KR)

( * ) Notice: Subject to any disclaimer, the term of this patent is extended or adjusted under 35 U.S.C. 154(b) by 106 days.

(21) Appl. No.: 12/462,461

(22) Filed: Aug. 4, 2009

(65) Prior Publication Data

US 2010/0044220 A1   Feb. 25, 2010

(30) Foreign Application Priority Data

Aug. 21, 2008   (KR) .................. 10-2008-0081988

(51) Int. Cl.
*C25B 11/12* (2006.01)
*H01B 1/08* (2006.01)
*H01B 1/20* (2006.01)
*H01B 1/24* (2006.01)
*B29C 67/24* (2006.01)

(52) U.S. Cl. ........ 204/294; 252/503; 252/506; 252/509; 977/742; 977/750; 977/752; 264/102; 264/46.4; 264/46.8; 264/241; 264/259; 264/299; 264/319

(58) Field of Classification Search .................. 204/294; 252/503, 506, 509; 977/742, 750, 752; 264/102, 264/46.4, 46.8, 241, 259, 299, 319
See application file for complete search history.

(56) References Cited

U.S. PATENT DOCUMENTS

| 2010/0116648 A1* | 5/2010 | Hwang | 204/230.8 |
| 2011/0024695 A1* | 2/2011 | Hwang | 252/503 |
| 2011/0127160 A1* | 6/2011 | Hwang | 204/278 |

* cited by examiner

*Primary Examiner* — Bruce Bell
(74) *Attorney, Agent, or Firm* — Echelon Law Group, PC

(57) ABSTRACT

The hydrogen-oxygen generating electrode plate using a carbon nano tube includes a carbon nano tube (CNT); a carbon (C); NiO; NaTaO3; and a catalyst. The method for manufacturing a hydrogen and oxygen generating electrode plate using a carbon nano tube, includes a step S1 for grinding into high-density powders; a step S2 for uniformly mixing carbon nano tube powder, carbon powder, NiO powder, NaTaO3 powder and catalyst and forming a mixture having a high distribution degree; a step S3 for inputting the mixture into a mold and pressing the same and forming a pressing forming object; and a step S4 for plasticity-forming the pressing forming object in a vacuum plasticity furnace.

9 Claims, 1 Drawing Sheet

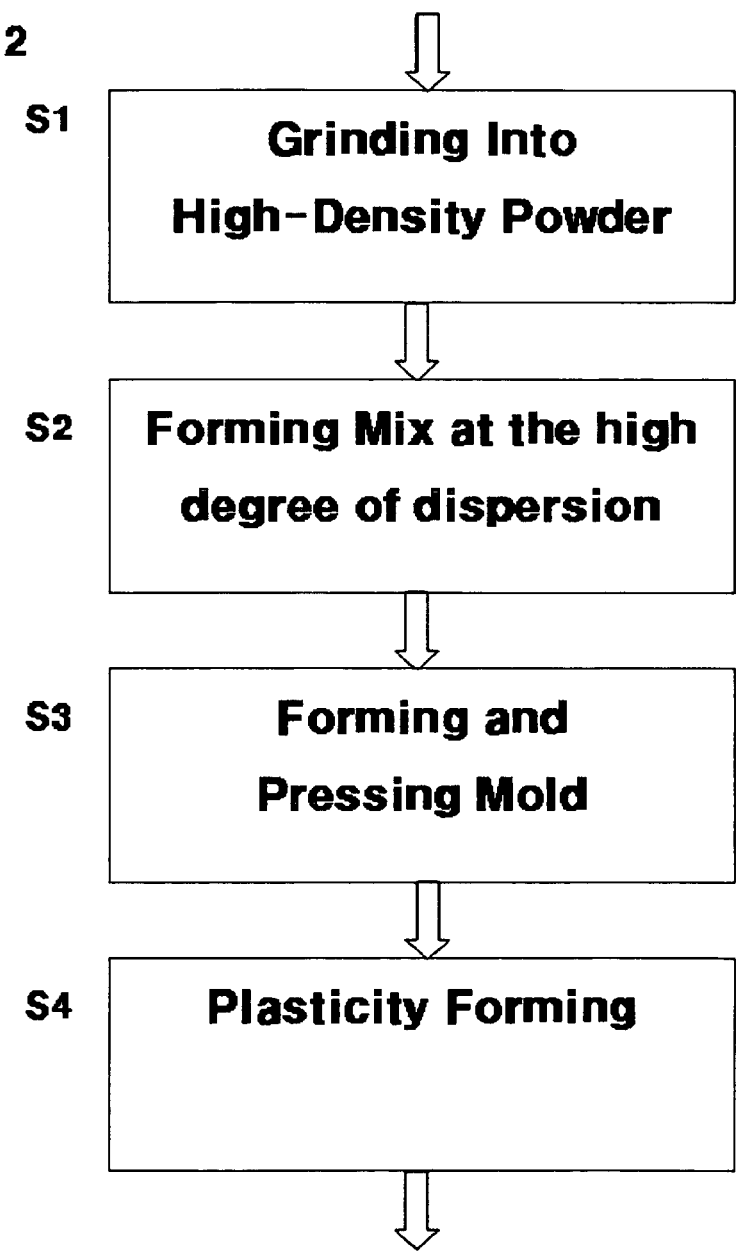

METHOD FOR MANUFACTURING HYDROGEN-OXYGEN GENERATING ELECTRODE PLATE

TECHNICAL FIELD

The present invention relates to a hydrogen-oxygen generating electrode plate using a carbon-nano tube and a method for manufacturing the same, and in particular to hydrogen-oxygen generating electrode plate using a carbon-nano tube and a method for manufacturing the same by means of which it is possible to effectively generate hydrogen and oxygen from water.

BACKGROUND ART

In apparatus for generating hydrogen and oxygen through an electrolysis using water, an electrode plate is installed for electrolyzing water and generating a mixed gas of hydrogen and oxygen which are a non-pollution energy source. At this time, the molecular ratio of hydrogen and oxygen generated by means of an electrolyte plate is 2:1, and as shown in FIG. 1, hydrogen is generated on the surface of a negative electrode plate in an air bubble form, and oxygen is generated on the surface of a positive electrode plate in an air bubble form. The electrode plate which is used for the electrolysis of water is manufactured by coating platinum on the surface of a stainless steel.

The hydrogen and oxygen generated through electrolysis with the help of an electrolyte plate are mixed and become a mixed gas which can be combusted. A certain pollutant does not occur in the course of,combustion, so it tends to be a new energy source.

In case of an electrolyte plate formed of stainless or a platinum-coated stainless, the amount of hydrogen and oxygen is small as compared to an electric energy, so it is needed to burn by mixing an auxiliary fuel such as propane gas to hydrogen and oxygen. Therefore, economic efficiency is bad.

Since the surface of an electrode plate slowly decomposes and melts in the course of electrolysis, it is needed to exchange an electrolyte plate after a few hundreds of time pass.

DISCLOSURE OF THE INVENTION

Accordingly, it is an object of the present invention to provide a hydrogen-oxygen generating electrode plate using a carbon-nano tube and a method for manufacturing the same which overcome the problems encountered in the conventional art.

It is another object of the present invention to provide a hydrogen-oxygen generating electrode plate using a carbon-nano tube and a method for manufacturing the same which can make it possible to promote economic productivity by increasing the amount of hydrogen and oxygen as compared to an electric energy inputted.

It is further another object of the present invention to provide a hydrogen-oxygen generating electrode plate using a carbon-nano tube and a method for manufacturing the same which can be applied to various standards of hydrogen-oxygen generating apparatuses since they can be implemented in various forms.

It is still further another object of the present invention to provide a hydrogen-oxygen generating electrode plate using a carbon-nano tube and a method for manufacturing the same which does not need to exchange electrode plates since decomposition does not occur even when an electrolysis is performed for a long time.

To achieve the above objects, in a hydrogen-oxygen generating electrode plate for generating hydrogen and oxygen by electrolysis-performing water, there is provided a hydrogen-oxygen generating electrode plate using a carbon nano tube comprising a carbon nano tube (CNT); a carbon (C); NiO; NaTaO3; and a catalyst.

With respect to carbon 100 weight %, the electrode plate is formed of 2~15 weight % of carbon nano tube, 80~360 weight % of NiO, 20~130 weight % of NaTaO3 and 10~200 weight % of catalyst.

The catalyst is formed of at least one selected from the group comprising La, photo tourmaline and Pt (platinum).

To achieve the above objects, in a method for manufacturing a hydrogen and oxygen generating electrode plate for generating hydrogen and oxygen through an electrolysis using water, there is provided a method for manufacturing a hydrogen and oxygen generating electrode plate using a carbon nano tube, comprising a step S2 for uniformly mixing carbon nano tube powder, carbon powder, NiO powder, NaTaO3 powder and catalyst and forming a mixture having a high dispersion degree; a step S3 for inputting the mixture into a mold and pressing the same and forming a pressing forming object; and a step S4 for plasticity-forming the pressing forming object in a vacuum plasticity furnace.

In the step S2, the pressing forming object is pressed under a pressure of 500~1500 ton/cm$^2$.

In the step S3, the pressing forming object is plasticity-processed for 20~400 minutes at 600~2000° C., and in the step S3, the plasticity is performed in a vacuum plasticity furnace into which the input of oxygen is blocked.

The catalyst is formed of at least one selected among the group comprising La, powder type photo tourmaline, and powder type platinum.

With respect to carbon 100 weight %, the electrode plate is formed of 2~15 weight % of carbon nano tube, 80~360 weight % of NiO, 20~130 weight % of NaTaO3 and 10-200 weight % of catalyst.

Effects

In the hydrogen-oxygen generating electrode plate and the method for manufacturing the same according to the present invention, economic production can be achieved without mixing an auxiliary fuel such as propane gas by increasing the amount of hydrogen and oxygen as compared to an electric energy inputted.

In addition, since the forms are stipulated through a compression and plastic process, it is possible to implement in various forms depending on the use purpose and capacity to be used.

Since the surface of the electric plate does not decompose in the course of electrolysis in the electrode plate according to the present invention, the electrode plate is not needed to exchange even after a few thousands of use as compared to a conventional electrode plate.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 1 shows an electrode plate; and

FIG. 2 shows a flow chart for describing methods of manufacturing electrode plates according to embodiments of the present disclosure.

MODES FOR CARRYING OUT THE INVENTION

The hydrogen-oxygen generating electrode plate and the method for manufacturing the same according to the present invention will be described.

The electrode plate used for generating hydrogen and oxygen by using a carbon-nano tube can generate hydrogen and oxygen using water through an electrolysis, and the following composition ratio is needed so as to increase the generating amount of hydrogen and oxygen as compared to electric source inputted.

The hydrogen-oxygen generating electrode plate is formed of a carbon nano tube CNT, carbon C powder, oxide nickel NiO powder, NaTaO3 powder and catalyst used for promoting electrolysis. The catalyst is formed of at least one selected from the group comprising La, photo nano tourmaline and Pt. Powder form is preferred.

The composition ratio will be described based on carbon powder 100 weight %.

The composition ratio of carbon nano tube CNT is 2~15 weight %, preferably, 3~10 weight % with respect to carbon 100 weight %. When the composition ratio of the carbon nano tube is less than 0.5 weight %, the conductivity of electrode surface manufactured by carbon having relatively low conductivity is decreased, and when it is above 60 weight %, it is impossible to expect a distribution effect of carbon nano tube which has a low mixing performance, and a density and strength of the electrode plate is weakened.

It is preferred that the carbon nano tube has a particle size of 0.005~10 μm for enhancing a distribution force with another composition powder, preferably it is 20~100 μm. The carbon nano tube used in the present invention is selectively equipped with a single wall, a multiple wall, and a carbon nano fiber.

The carbon nano tube is a material formed in a tube shape as one carbon is engaged with another carbon atom in a hexagonal honey comb and has anisotropy and various structures such as a single wall, a multiple wall and a bundle shape. The diameter of a tube is nano meter (nm=1 m/one billion), a very small size. The carbon nano tube has a very excellent electric conductivity unlike other carbon materials such as active carbon or carbon and diamond and has a good electric field discharge performance. Namely, the carbon contained in graphite having a good electric conductivity is formed in a sp2 coupling structure, and an insulation diamond has a sp3 coupling structure, so a carbon nano tube is formed of multiple pore structures having a surface area larger by 1000 times as compared to a bulk structure, so the surface area for an oxidation and reduction reaction is maximized when applying to an electrical and chemical apparatus, whereby the total reaction is significantly enhanced.

The carbon C is generally used as a coupling member for coupling a carbon nano tube with another composition. Namely, the carbon is used for coupling a carbon nano tube having a very low coupling performance with another composition powder. The particle size of the carbon preferably is in a range of 0.5~200 μm.

NiO is melted in the course of manufacturing an electrode plate through a plastic process and is combined with another composition, which leads to largely increasing the strength of an electrode plate. The composition ratio of NiO is 80~360 weight % with respect to the carbon 100 weight %, preferably, 120~240 weight5. When NiO is less than 80 weight %, since the strength of an electrode plate is not enough, so it can easily be broken, and when it is above 360 weight %, hydrogen generation efficiency becomes worse, which leads to a poor production.

NaTaO3 is used so as to increase the generating amount of hydrogen from an electrode plate. The composition ratio of NaTaO3 is 20~130 weight % with respect to carbon 100 weight %, preferably 33~100 weight %. When NaTaO3 is less than 20 weight %, the generating amount of hydrogen from an electrode plate is decreased, and when it is above 130 weight %, the strength of an electrode plate is weakened.

The composition ratio of the catalyst is 10~200 weight % with respect to carbon 100 weight %.

When catalyst is formed of photo nano tourmaline, La (Lanthanum) and platinum, each composition ratio is as follows.

The composition ratio of photo nano tourmaline is 10~75 weight % with respect to carbon 100 weight %, preferably 16~50 weight5%.

The photo nano tourmaline is performed in such a manner that tourmaline is ground from a few micro size to a few nano meter in a powder form and is plasticity-processed at about 1300° C. Tourmaline is a mineral belonging to a hexagonal structure having a crystal structure like crystal, which is capable of generating a lot of anion along with electricity by means of friction and is capable of promoting electrolysis for thereby generating a lot of hydrogen and oxygen. Since tourmaline is ground to powder and is plasticity-processed for thereby implementing a photo catalyst which has a lot of micro pores for thereby increasing the contracting surface area with water, by means of which it is possible to promote electrolysis of water.

La (Lanthanum) is used so as to generate hydrogen as an electrode plate more effectively performs electrolysis using water. The composition ratio of La (Lanthanum) is 5~100 weight % with respect to carbon 100 weight %, preferably 15~60 weight %.

Platinum is used so as to allow an electrode plate to more effectively perform electrolysis with respect to water, and the composition ratio of platinum is 3~20 weight % with respect to carbon 100 weight %, preferably 5~c15 weight %.

The method for manufacturing a hydrogen-oxygen generating electronic plate according to the present invention.

Referring now to FIG. 2, in order to manufacture a hydrogen-oxygen generating electrode plate using a carbon nano tube, there is a step S1 for grinding carbon C, Nio and NaTaO3 into high-density powders.

A step S2 is for uniformly mixing a carbon nano tube CNT, a powder type carbon C, a powder type NiO, a powder type NaTaO3 and a catalyst for promoting an electrolysis and for forming a mixture. At this time, the catalyst is formed of one selected from the group comprising La (Lanthanum), a power type photo nano tourmaline and a powder type platinum Pt. The above compositions are distributed at a high dispersion degree using a known ultra critical fluid method or an inversed micelle method.

In step S3, the mixture is inputted into a mold and is pressed under a pressure of 500~1500ton/cm$^2$ for thereby forming a pressing forming object. In the pressing step, the power type pressing forming object becomes a solid object.

At this time, various kinds of electrode plates can be implemented by adapting a specific forming groove to a mold. For example, a complex geometric shape, for example a shape with multiple grooves protruded from its edge or concaved can be used.

In a step S4, a pressing forming object is plasticity-processed in a vacuum plasticity furnace at a temperature range of 600~2000° C. for 20~40 minutes. When forming a pressing forming object, the plasticity furnace should be a vacuum plasticity furnace so as to fully prevent the input of oxygen. When oxygen is inputted, an oxidation occurs in the course of plasticity, by means of which a hydrogen and oxygen generation efficiency of an electrode plate is decreased.

NiO is melted in the course of plasticity step and engages carbon, carbon nano tube and catalyst to a solid member.

The above embodiments of the present invention will be described in more details. The following embodiments are provided for just illustrations, and the protection scope of the present invention is not limited by the disclosed embodiments of the present invention.

EXAMPLES

A mixture is manufactured by mixing carbon nano tube, carbon powder, NiO powder, NaTaO3 powder, photo nano tourmaline, La and platinum powder using a mixer. At this time, 30 g of carbon, 2 g of carbon nano tube, 60 g of NiO, 20 g of NaTaO3, 10 g of photo nano tourmaline, 15 g of La and 3 g of platinum are mixed in order to manufacture a mixture at a high distribution degree. The mixture is inputted into a mold having a plate shape and is pressed under a pressure of 1000 ton/cm$^2$ for thereby forming a pressing forming object. The pressing forming object is plasticity-processed in a vacuum plasticity furnace for 400 minutes at 1700° C., through which an electrode plate is finished.

Multiple pores of the sizes of nm are formed on the surface of the electrode plate which was manufactured through the above procedures, with micro grooves and mounts being formed. Since numerous grooves and mounts of sizes of nm are formed in the electrode plate, the contact surface area with water increases. For example, when water is oxidized in grooves, which generates oxygen, at the same time hydrogen ions are generated. The hydrogen ions are gathered at the tops of the mounts, and a lot of hydrogen and oxygen gases are produced by promoting a reaction for reducing hydrogen ions with the helps of catalyst.

Comparison Examples

The electrode plate used for electrolysis-performing water generally is formed of a stainless steel. The compared data are shown in the following table.

| Items | Examples | Comparison example (stainless steel) |
|---|---|---|
| Electrode plate (L × W × T) | 15 cm × 15 cm × 1 cm | 15 cm × 15 cm × 1 cm |
| Consumption power (W) | 300 W | 23,000 W |
| Total generation amount of hydrogen and oxygen per unit time | 58,000 L/Hour | 6000 L/Hour |

As seen in the above comparison table, the electrode plate according to the present invention can generate a lot of hydrogen and oxygen gases with respect to the input energy as compared to the electrode plate used in the conventional comparison electrode plate.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a hydrogen-oxygen generating electrode plate for generating hydrogen and oxygen by electrolysis-performing water, a hydrogen-oxygen generating electrode plate using a carbon nano tube, comprising:
    a carbon nano tube (CNT);
    a carbon (C);
    NiO;
    NaTaO3; and
    a catalyst.

2. The electrode plate of claim 1, wherein with respect to carbon 100 weight %, said electrode plate is formed of 2~15 weight % of carbon nano tube, 80~360 weight % of NiO, 20~130 weight % of NaTaO3 and 10~200 weight % of catalyst.

3. The electrode plate of claim 1, wherein said catalyst is formed of at least one selected from the group comprising La, photo tourmaline and Pt (platinum).

4. In a method for manufacturing a hydrogen and oxygen generating electrode plate for generating hydrogen and oxygen through an electrolysis using water, a method for manufacturing a hydrogen and oxygen generating electrode plate using a carbon nano tube, comprising:
    a step S1 for uniformly mixing carbon nano tube powder, carbon powder, NiO powder, NaTaO3 powder and catalyst and forming a mixture having a high distribution degree;
    a step S2 for inputting the mixture into a mold and pressing the same and forming a pressing forming object; and
    a step S3 for plasticity-forming the pressing forming object in a vacuum plasticity furnace.

5. The method of claim 4, wherein in said step S2, the pressing forming object is pressed under a pressure of 500~1500 ton/cm$^2$.

6. The method of claim 4, wherein in said step S3, the pressing forming object is plasticity-processed for 20~400 minutes at 600~2000° C.

7. The method of claim 6, wherein in said step S3, the plasticity is performed in a vacuum plasticity furnace into which the input of oxygen is blocked.

8. The method of claim 4, wherein said catalyst is formed of at least one selected among the group comprising La, powder type photo tourmaline, and powder type platinum.

9. The method of claim 4, wherein with respect to carbon 100 weight %, said electrode plate is formed of 2~15 weight % of carbon nano tube, 80~360 weight % of NiO, 20~130 weight % of NaTaO3 and 10~200 weight % of catalyst.

* * * * *